US010778274B1

(12) United States Patent
Paraskevaidis

(10) Patent No.: US 10,778,274 B1
(45) Date of Patent: Sep. 15, 2020

(54) WALL MOUNTABLE SECURITY CASE

(71) Applicant: Honeywell International Inc., Morris Plains, NJ (US)

(72) Inventor: Charilaos Paraskevaidis, Yonkers, NY (US)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 16/400,875

(22) Filed: May 1, 2019

(51) Int. Cl.
H04B 1/3888 (2015.01)
H04B 1/3883 (2015.01)

(52) U.S. Cl.
CPC ......... H04B 1/3888 (2013.01); H04B 1/3883 (2013.01)

(58) Field of Classification Search
CPC ............................ H04B 1/3888; H04B 1/3883
See application file for complete search history.

(56) References Cited

U.S. PATENT DOCUMENTS

| 8,730,029 | B2 | 5/2014 | Petricoin, Jr. | |
| 9,307,131 | B1* | 4/2016 | Breen | H04N 5/2257 |
| 2002/0163997 | A1* | 11/2002 | Bergman | G08B 25/008 379/37 |
| 2012/0068832 | A1* | 3/2012 | Feldstein | F16M 11/041 340/12.5 |
| 2012/0087078 | A1 | 4/2012 | Medica et al. | |
| 2015/0160633 | A1* | 6/2015 | Adamik | H04L 67/025 362/555 |
| 2017/0084143 | A1 | 3/2017 | Acera et al. | |

* cited by examiner

Primary Examiner — David Bilodeau
(74) Attorney, Agent, or Firm — Seager, Tufte & Wickhem, LLP

(57) ABSTRACT

A wall mountable security case for use with a security system of a building may include a housing defining a cavity for receive a tablet computing device, wherein the cavity is defined by a back wall, a front wall and side walls extending between the back wall and the front wall. A communication unit may be housed by the housing and include one or more transceivers for communicated with security devices and/or other computing devices. The case may further include at least one tamper detector for detecting an unauthorized tampering, a controller housed by the housing and operatively coupled to the communication unit and the at least one tamper detector, a power input for receiving primary power and for providing the primary power to the communication unit and the controller, and a back-up battery.

20 Claims, 4 Drawing Sheets

WALL MOUNTABLE SECURITY CASE

TECHNICAL FIELD

The disclosure is directed towards security and/or other building automation systems, and more particularly to a wall mountable security case for use with security and/or other building automation systems.

BACKGROUND

Security systems are generally known. Such systems are typically used to protect people and assets within secured area such as a home or business from any of a number of threats. For example, a security system may be arranged to detect threats from unauthorized intruders entering the secured area. A security system may also be used to detect environmental threats such as fire, carbon monoxide or natural gas leaks.

In many security systems, a central controller is provided along with a number of remote sensors distributed throughout the secured area. In some cases, fire detectors may be provided in hallways or near combustion sources. Limit switches may be provided on the doors and windows of the secured area. Motion detectors and/or glass break detectors may be provide in other regions of the secured area. Video cameras may also be connected to the central controller. These are just examples.

A user interface is also typically provided. The user interface can be part of the central controller or part of another device. The user interface may allow a user to interact with the security system. Such interactions may include, for example, arming and disarming the security system, viewing status information of various components of the security system, viewing alarms and/or other events of the security system, configuring the security system and/or performing other functions.

SUMMARY

The disclosure is directed towards security and/or other building automation systems, and more particularly to a wall mountable security case for securely housing a controller that includes a user interface for use with security and/or other building automation systems. In some instances, the wall mountable security case may be configured to securely house a tablet computing device. This may allow a conventional tablet computing device to be installed in the wall mountable security case and used as a user interface for a security and/or other building automation systems. The conventional tablet computing device may be loaded with an application program to support the security and/or other building automation system. The application program may leverage the familiarity of the graphical user interface features of the conventional tablet computing device to reduce training needs for the users.

In one example, a wall mountable security case may be used with a security system of a building. The wall mountable security case may include a housing defining a cavity for receive a tablet computing device. The cavity may be defined by a back wall, a front wall and side walls extending between the back wall and the front wall. A communication unit may be housed by the housing. The communication unit may include a first transceiver for receiving messages from one or more remotely located security devices of the security system of the building, and a second transceiver for communicating with the tablet computing device when the tablet computing device is received by the cavity. The security case may further include at least one tamper detector for detecting an unauthorized tamping with the wall mountable security case, a controller housed by the housing and operatively coupled to the communication unit and the at least one tamper detector, a power input for receiving primary power and for providing the primary power to the communication unit and the controller, and a back-up battery for providing back-up power to the communication unit and the controller when the primary power is unavailable.

In another example, a wall mountable security case for use with a security system of a building may include a housing defining a cavity for receive a tablet computing device. The cavity may be defined by a back wall, a front wall and side walls extending between the back wall and the front wall. A communication unit may be housed by the housing. The communication unit may include a first transceiver that is wireless and operates in a frequency band that is less than 1 GHz for receiving messages from one or more remotely located security devices of the security system of the building and a second transceiver that operates in a frequency band that is greater than 1 GHz for communicating with the tablet computing device when the tablet computing device is received by the cavity. A controller may be housed by the housing and operatively coupled to the communication unit. The security case may further include a power input for receiving primary power and for providing the primary power to the communication unit and the controller and a back-up battery for providing back-up power to the communication unit and the controller when the primary power is unavailable.

In another example, a wall mountable security case for use with a security system of a building may include a housing defining a cavity for receive a tablet computing device. The cavity may be defined by a back wall, a front wall and side walls extending between the back wall and the front wall. A communication unit may be housed by the housing. The communication unit may include a wireless security transceiver that operates in a frequency band that is less than 1 GHz for receiving messages from one or more remotely located security devices of the security system of the building, a Bluetooth transceiver for communicating with the tablet computing device when the tablet computing device is received by the cavity, and a network transceiver for communicating over a network. A controller may be housed by the housing and operatively coupled to the communication unit. The security case may further include a power input for receiving primary power and for providing the primary power to the communication unit and the controller and a back-up battery for providing back-up power to the communication unit and the controller when the primary power is unavailable.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which.

Figure 1:
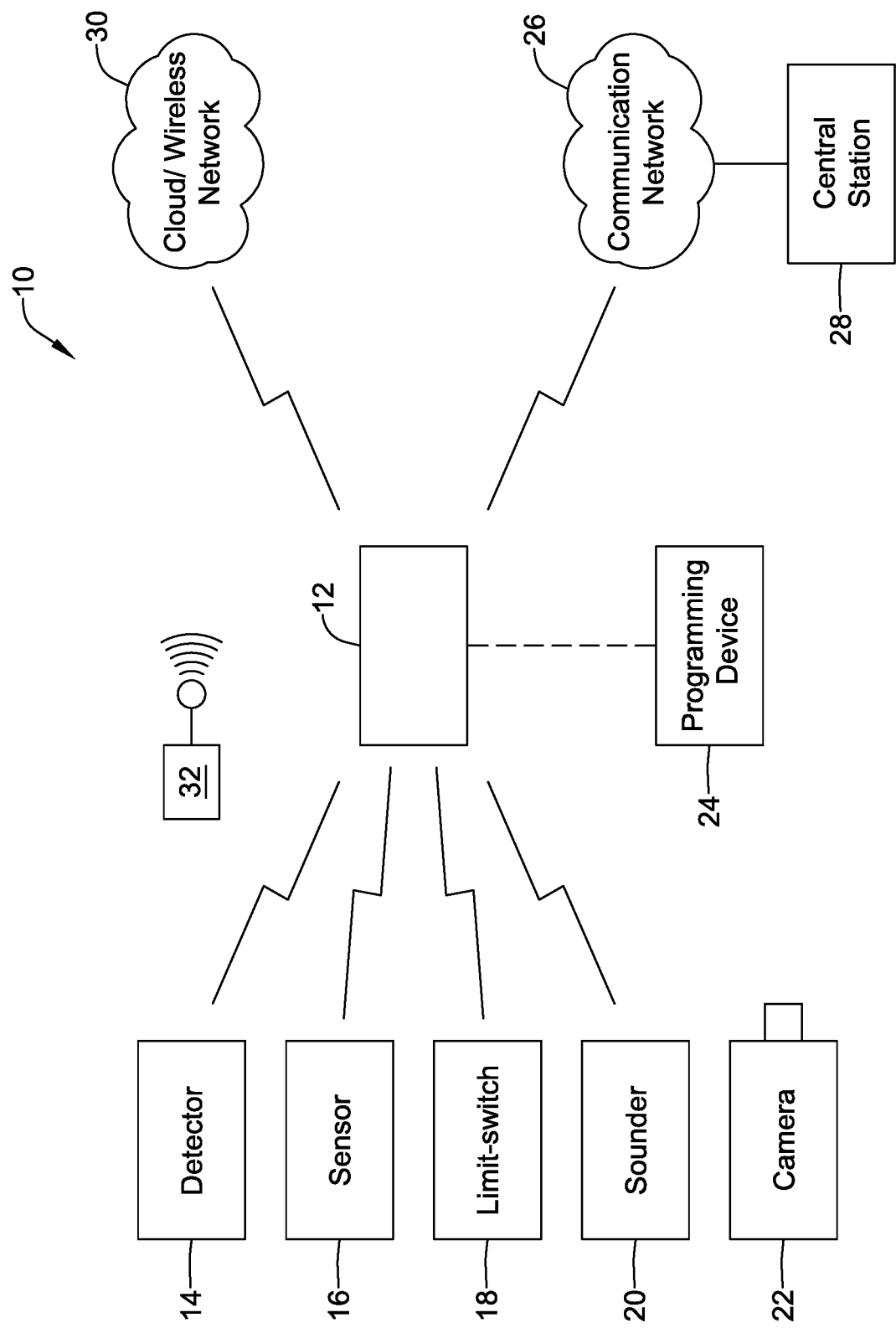
FIG. 1 is a schematic diagram of an illustrative security system.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

The disclosure is directed towards security systems, and more particularly to a wall mountable security case for use with security and/or other systems. As security system control panels become more advanced, they become more like tablet computing devices. The security system control panels may be difficult and expensive to manufacture. It is completed that conventional tablet computing devices may be used as a substitute. However, conventional tablet computing devices lack several features that would be desirable when functioning as a security system control panel. Such features include, for example: a dedicated security radio for communicating with the security devices such as security sensors, a tamper detection mechanism, and a 24 hour battery back-up. The present disclosure is directed towards a wall mountable security case that allows, for example, an off-the-shelf tablet computing device to be used as a security system control panel interface.

FIG. 1 shows an illustrative security system 10 that includes a wall mountable security case 12 housing a controller that includes a user interface, such as a tablet computing device 24. As will be described herein, the wall mountable security case 12 may include features that allow a tablet computing device 24 to be used as a security system control panel. The security case or frame 12 may be provided with security system logic. In some cases, a user may interact with the security system logic through, for example, a tablet computing device 24, a wireless network, and/or the cloud 30.

The illustrative security system 10 includes a number of other devices, such as, but not limited to, one or more detectors 14 (e.g., motion detectors), sensors 16 (e.g., glass break sensors), limit-switches 18, sounders 20, video cameras 22, and/or other security or home automation devices. The video camera 22 can be pan-tilt-zoom (PTZ) cameras, but this is not required. In some instances, the video camera 22 may be a digital camera and may capture video images and/or still images. In some cases, detectors 14, sensors 16, limit-switches 18, and sounders 20, and cameras 22 may be considered security system devices. The devices 14, 16, 18, 20, and 22 can be used to monitor actions in a building. In the example shown, the wall mountable security case 12 can receive data from one or more of the devices 14, 16, 18, 20, and 22 via wireless or wired communication.

In some instances, the one or more devices 14, 16, 18, 20, and 22 may communicate with the a transceiver of the wall mountable security case 12 using a wireless communication protocol such as, for example, cellular communication, RF6, ZigBee, Bluetooth, Bluetooth® low energy (BLE), Wi-Fi, IrDA, dedicated short range communication (DSRC), EnOcean, Redlink or any other suitable wireless protocols, as desired. In some cases, a communications gateway 32 may be provided to facilitate communication between the various security system components 12, 14, 16, 18, 20, and 22 over a local area network (LAN), a wide area network (WAN), and/or the internet. In some cases, the one or more devices 14, 16, 18, 20, and 22 may communicate with the a transceiver of the wall mountable security case 12 using a security radio that operates in a lower frequency band such as less than 1 GHz. The wall mountable security case 12 may communicate with communicate with the tablet computing device, cloud/wireless network 30 and/or communication network 26 using one or more communication radios that operate in a higher frequency band such as greater than 1 GHz.

A plurality of sensors can be included within a plurality of devices 14, 16, 18, 20, and 22. These devices may be easily installed by placing them in the desired locations. In some cases, the devices 14, 16, 18, 20, and 22 may operate in a wireless manner in conjunction with a central hub, such as the wall mountable security case 12, in the same manner as if they were interoperating with a central controller of a conventional security system. That is, in some cases, the wall mountable security case 12 and a tablet computing device 24 housed by the wall mountable security case 12 can function as a central controller of the security system.

Each of the devices 14, 16, 18, 20, and 22 may be configured to monitor a condition of the premises and send data signals to the wall mountable security case 12 indicative of their status, alarm conditions and the like. If the wall mountable security case 12 receives an event (e.g., alarm event, etc.), the wall mountable security case 12 may identify and transmit one or more security system messages to a remote location. In some cases, the security system messages may be transmitted to a local device such as a horn in the building. In other instances, the wall mountable security case 12 may transmit the security system messages to, for example, a user's phone via a cloud platform 30, a remote central monitoring station 28, and/or any other suitable location. In some cases, if it is determined that there is an alarm event (e.g., fire, break in, etc.) occurring, a number of contacts (e.g., police, fire department, hospital, etc.) and/or a remote central monitoring station 28 may be contacted through a communication network 26 and informed of details relating to the alarm event (e.g., type of event, address of the event, etc.). In some instances, the remote central monitoring station 28 may be an off-site and/or remote monitoring station contracted by the owners of the security system 10 to monitor the state of the security system 10.

In some cases, the wall mountable security case 12 may transmit the events (e.g., alarm event, etc.) to the tablet computing device 24, typically using one or more communication radios that operate in a higher frequency band such as greater than 1 GHz or via a wired interface. The tablet computing device 24 may then transmit the one or more security system messages to a remote location such as a user's phone via a cloud platform 30, a remote central monitoring station 28, and/or any other suitable location. Alternatively, or in addition, the tablet computing device 24 may display the received events on the user interface of the tablet computing device 24.

Figure 2:
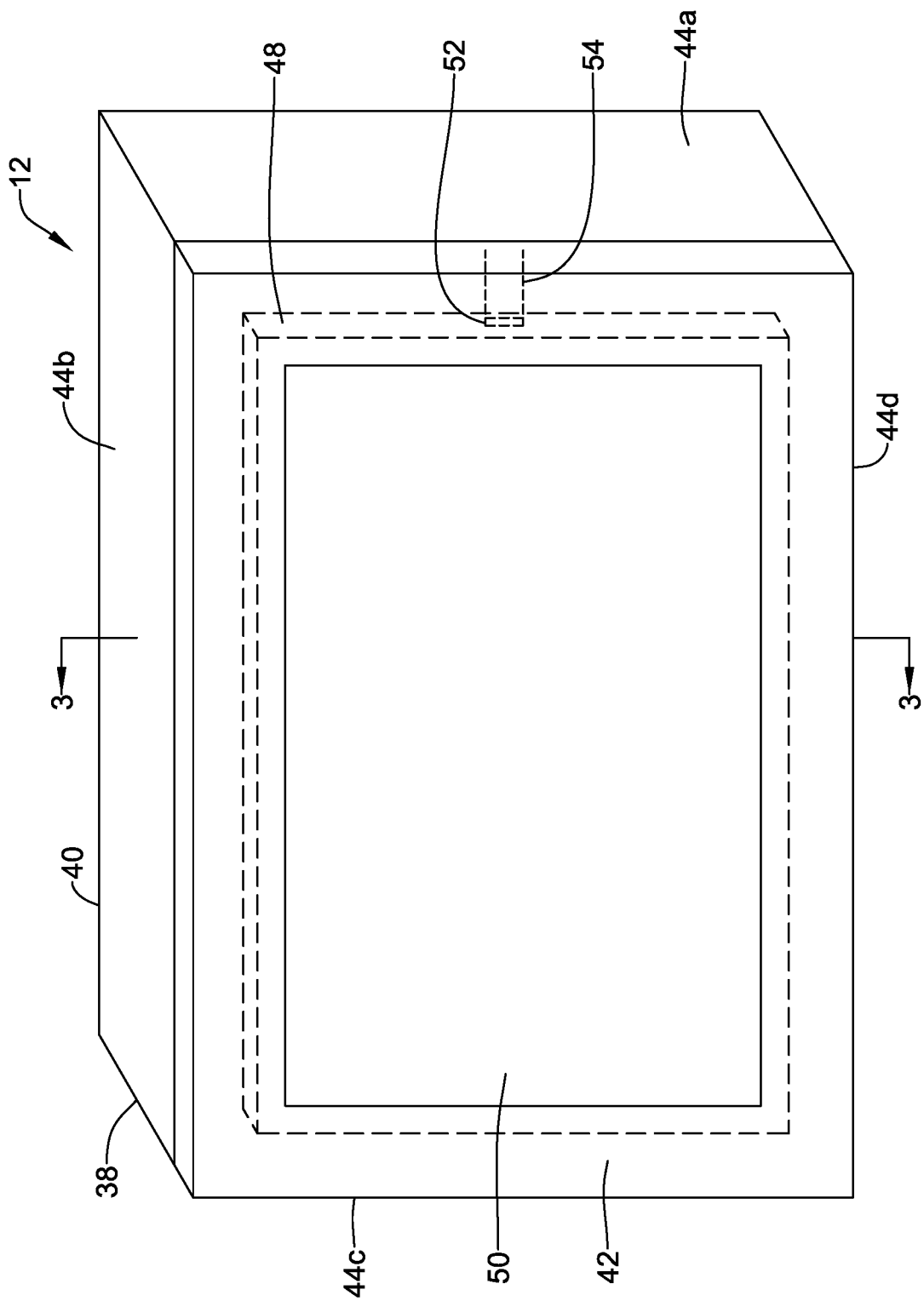
FIG. 2 is a perspective view of an illustrative wall mountable security case for use in, for example, the illustrative security system of FIG. 1.

FIG. 2 is a perspective view of the illustrative wall mountable security case 12 for use with, for example, the illustrative security system 10 of FIG. 1. The wall mountable security case 12 may include a housing 38 including back wall 40, a front wall 42, and one or more side walls 44*a*, 44*b*, 44*c*, 44*d* (collectively, 44) extending between the back wall 40 and the front wall 42. As will be described in more detail herein, the housing 38 may be molded from a polymer or other material that is transparent or at least substantially transparent to RF energy. As a result, the housing 38 may not block communication signals, such as WiFi or other communication frequencies, being transmitted to or from the wall mountable security case 12 and/or tablet computing device 48 housed by the wall mountable security case 12. While the wall mountable security case 12 is illustrated as having a generally rectangular profile, the wall mountable security case 12 may have any suitable shape or profile desired.

Figure 3:
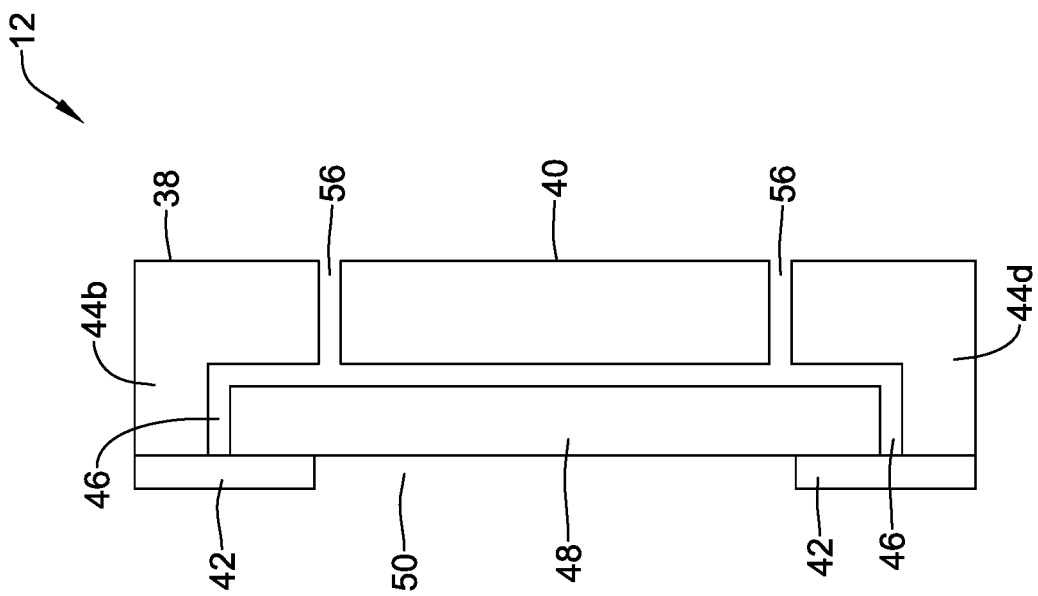
FIG. 3 is a cross-sectional side view of the illustrative wall mountable security case of FIG. 2.

The back wall 40, the front wall 42, and side walls 44 may collectively define a cavity 46 for receiving a tablet computing device 48, as shown in FIG. 3, which illustrates a cross-sectional view of the wall mountable security case 12, taken at line 3-3 of FIG. 2. The tablet computing device 48 may be a convention tablet computing device which may include a touch screen user interface/display for receiving input and displaying information. The tablet computing device 48 may also include a memory, processor, battery, wireless or wired communications capabilities, etc. The tablet computing device 48 may include a port 52 for receiving an electrical connection 54. The electrical connection 54 may provide power to the tablet computing device 48 from the wall mountable security case 12. Alternatively, or additionally, the electrical connection 54 may facilitate communication between the memory/processing unit of the tablet computing device 48 and a controller or processing unit 60 (see, for example, FIG. 4) of the wall mountable security case 12.

The front wall 42 may include a front plate that is configured to be removable to allow a user to install and/or remove the tablet computing device 48 to/from the cavity 46 under certain conditions. For example, the front wall 42 may be snap fit with the side walls 44 to allow for easy removal, although other coupling mechanisms may be used, as desired. In some cases, the front wall 42 may be lockably secured to the wall mountable security case 12 to help prevent an unauthorized user from opening the front wall 42 and stealing the tablet computing device 48.

In some embodiments, the front wall 42 may include an opening 50 configured to allow a user to access the touch screen interface of the tablet computing device 48. However, this is not required. It is contemplated that the front wall 42 may be formed from an electrically conductive material which allows a user's touch to transfer from the front wall to the touch screen interface of the tablet computing device 48. In such an instance, the front wall 42 may extend fully over the surface of the tablet computing device 48 such that the tablet computing device 48 is fully enclose within the cavity 46 of the housing 38. For example, the front wall 42 may be formed from, or at least partially formed from, an optically clear and/or transparent membrane which transfers touch from an outer surface of the membrane to the touch screen tablet computing device 48. When so provided, the front wall 42 may include a rigid perimeter defining the opening 50 with the optically clear and/or transparent membrane extending across the opening (not explicitly shown). While not explicitly shown, the housing 38 may include one or more mounting features configured to maintain the tablet computing device 48 in a desired orientation/position within the cavity 46. Such mounting features may include, but are not limited to hooks, tabs, snap fittings, adhesives, etc.

The housing 38 may include one or more apertures 56 extending through the back wall 40 (e.g., from the cavity 46 to the back of the housing). The one or more apertures may be configured to accommodate field wires (not explicitly shown) that enter from a rear of the security case. When so provided, the wall mountable security case 12 may provide an electrical connection between the wall mountable security case 12 and/or tablet computing device 48 and the field wires (e.g., electrical supply and/or security system devices). The wall mountable security case 12 may be secured relative to a vertical surface such as a wall by using the one or more apertures 56, sometimes using fasteners such as screws, nails or the like. The wall mountable security case 12 may include fewer than two or more than two apertures 56 for receiving a fastener, as desired. In some cases, having a total of three mounting apertures 56 may make it easier, particularly when mounting directly to a wall, to hit a wall stud with at least one of the fasteners. In some cases, it will be appreciated that having three mounting apertures 56, particularly arranged at the vertices of a triangle, may be sufficient to securely fasten the wall mountable security case 12 to a wall without requiring a fourth mounting aperture and corresponding fastener.

Figure 4:
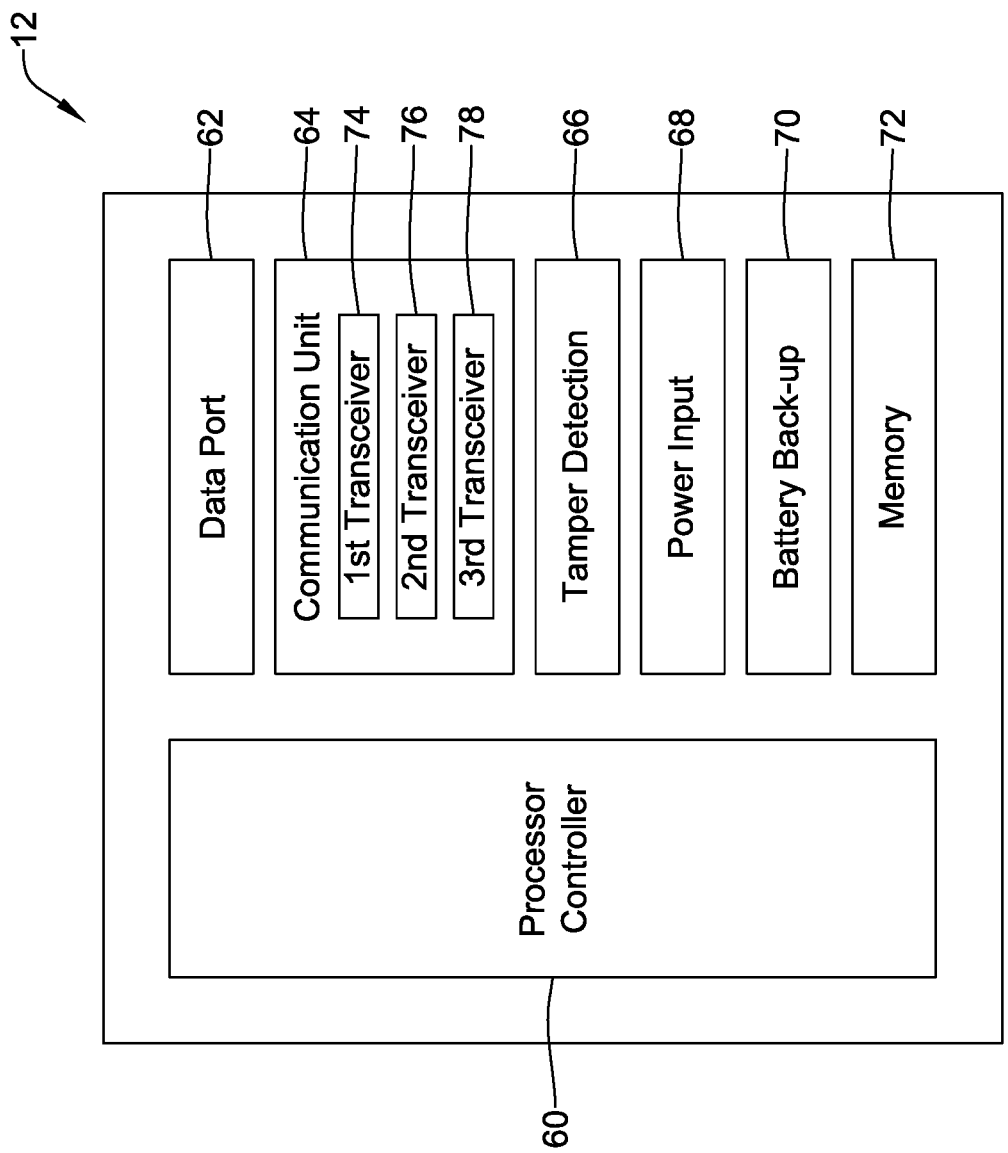
FIG. 4 is a schematic view of the illustrative wall mountable security case of FIG. 2.

FIG. 4 is a schematic view of the illustrative wall mountable security case 12 in which portions of a traditional security system control panel have been incorporated into the wall mountable security case 12. In FIG. 4, the wall mountable security case 12 includes a processor (e.g. microprocessor, microcontroller, etc.) 60, a data port 62, a communication unit 64, one or more tamper detection features 66, a power input 68, a battery back-up 70, and an internal memory 72 housed by the housing 38. In some cases, the internal memory 72 may be part of the controller 60.

The data port 62 of the wall mountable security case 12 may be a wireless port such as a Bluetooth™ port or any other wireless protocol. In other cases, the data port 62 may be a wired port such as a serial port, a parallel port, a CAT5 port, a USB (universal serial bus) port, and/or the like. In some instances, the data port 62 may be a USB port and may be used to download and/or upload information from a USB flash drive or some other data source. In some cases, the data port 62 may be configured to communicate with the controller 60 and may, if desired, be used to upload information to the controller 60 and/or memory 72, and/or download information from the controller 60 and/or memory 72. It is further contemplated that the data port 62 may be configured to communicate with the memory/processor of the tablet computing device 48. For example, the data port 62 may upload information to the tablet computing device 48 and/or download information from the tablet computing device 48. Information that can be uploaded and/or downloaded may include, for example, values of operating parameters. In some instances, the data port 62 may be used to upload and/or modify a previously-created security system configuration into the wall mountable security case 12, thereby hastening the configuration/programming process. In some cases, the data port 62 may be used to download a security configuration that has been created using the wall mountable security case 12, so that the security system configuration may be transferred to other similar security systems, hastening their configuration/programming process. In some cases, the data port 62 may be used to upload and/or download information pertaining to a security system dealer or contractor, if desired. In some cases, the data port 62 may be used to download data stored within the memory 72 of the wall mountable security case 12 and/or tablet computing device 48 for analysis. For example, the data port 62 may be used to download a faults and/or alerts log or parts thereof to a remote device such as a USB memory stick (also sometimes referred to as a thumb drive or jump drive), personal computer, laptop, iPAD® or other tablet computer, PDA, smart phone, or other remote device or network, as desired. In some cases, the data may be convertible to an MS EXCEL®, MS WORD®, text, XNL, and/or Adobe PDF® file, but this is certainly not required.

The wall mountable security case 12 may further include a power input 68 for receiving primary power. For example, the wall mountable security case 12 may be wired into a house or building's electrical system at the power input 68. The power input 68 may supply power to other electrically powered components of the wall mountable security case 12, such as but not limited to, the controller 60, the communication unit 64, etc. The power input 68 of the wall mountable security case 12 may also be configured to supply power to the tablet computing device 48, for example, via the electrical connection 54 (see FIG. 2). The wall mountable security case 12 may further include a back-up battery 70 for providing back-up power to the wall mountable security case 12 and/or the tablet computing device 48 when the primary power is unavailable. It is contemplated that the back up battery may be configured to supply power for at least 24 hours or more, but this is not required.

The communication unit 64 may include at least a first transceiver 74 and a second transceiver 76. The transceivers 74, 76 may include radiofrequency (RF) (wireless) communication capabilities such as, but not limited to, cellular communication, RF6, ZigBee, Bluetooth, Bluetooth® low energy (BLE), Wi-Fi, IrDA, dedicated short range communication (DSRC), EnOcean, Redlink or any other suitable wireless protocols, as desired. In some cases, the first and second transceivers 74, 76 may be configured to communicate over different frequencies. In some cases, the first transceiver 74 may be configured to operate in a lower frequency band than the second transceiver 76. For example, the first transceiver 74 may be a wireless transceiver configured to communicate over a dedicated security frequency, separate and distinct from WiFi and/or Bluetooth® frequencies, to receive messages from the one or more remotely located security devices 14, 16, 18, 20, and 22 of the security system of the building. In some cases, the first transceiver 74 may be configured to operate at frequency of 1 Gigahertz (GHz) or less. The second transceiver 76 may be a wireless WiFi and/or Bluetooth® transceiver (or other wireless transceiver) configured to communicate over a second frequency with the tablet computing device 48, a WiFi gateway, and/or any other desired device. In some cases, the second transceiver 76 may be a wired transceiver which may be wired to (e.g., USB, Ethernet, Firewire or other wired connections), or otherwise coupled with, the tablet computing device 48. In some cases, the second transceiver 76 may be configured to operate at frequency of 1 Gigahertz (GHz) or greater.

In some embodiments, the communication unit 64 may include the first transceiver 74 for communicating with the one or more remotely located security devices 14, 16, 18, 20, and 22 of the security system 10, the second transceiver 76 (e.g., a Bluetooth® transceiver) for communicating with the tablet computing device 48, and a third transceiver 78 (e.g., a network, cellular, and/or WiFi transceiver) for communicating over a network (e.g., with other remote devices, such as, but not limited to cell phones, other computing devices, computers, laptops, etc.).

In some cases, the controller or controller 60 of the wall mountable security case 12 may be programmed with security system logic, some or all of which would be normally provided by a central controller of a traditional security system. The controller 60 may be operatively coupled to the data port 62, the communication unit 64, the first transceiver 74, the second transceiver 76, the one or more tamper detection units 66 and/or the memory 72. In some cases, the controller 60 may be configured to receive one or more signals from one or more remote security system devices 14, 16, 18, 20, and 22 via the data port 62 and/or the communication unit 64. In some instances, the controller 60 may be configured to receive messages or signals from the one or more remotely located security devices 14, 16, 18, 20, and 22 via the first transceiver 74. For example, the first transceiver 74 may receive the messages from the one or more remote security system devices 14, 16, 18, 20, and 22 and communicate said messages to the controller 60. The controller 60 may be configured to transmit corresponding messages to the tablet computing device via wired or wireless communications by way of the second transceiver 76.

If one of the one or more signals correspond to an alarm event, the controller 60 may identify and transmit one or more security system messages to a remote location via the data port 62 and/or one or both of the wireless transceivers 74, 76. The remote location may include, for example, a horn in the secured area, a user's phone via a cloud platform, a remote central monitoring station, and/or any other suitable remote location as desired.

In some cases, the controller 60 of the wall mountable security case 12 may be programmed and/or controlled from the tablet computing device 48. For example, the controller 60 may be programmed and/or controlled via the user interface of the tablet computing device 48 that is in operative communication with the controller 60 via the second wireless transceiver 76. In some cases, the security system 10 may be activated and deactivated (armed and disarmed) by entering an access code at the user interface 48 of the tablet computing device 48. Alternatively, or in addition, the controller 60 may be programmed and/or controlled from a smartphone, a tablet computer, a laptop computer, a desktop computer and/or other device that is in operative communication with the controller 60 via the wireless transceiver 76. The security system 10 may also be activated and deactivated (armed and disarmed) through a WiFi equipped smart phone, tablet, gateway or the like. These are just some examples.

The configuration of controller 60 may include registering the various devices 14, 16, 18, 20, and 22 with the wall mountable security case 12 so that the wall mountable security case 12 will communicate only with the desired registered devices. It may also include exit delay times, entry delay times, as well as IP addresses for alarm reporting. Once entered, these (and other) configuration parameters may be stored in the nonvolatile memory 72 of the wall mountable security case 12 so that if the wall mountable security case 12 is powered down or replaced, the configuration data is maintained and loaded when the wall mountable security case 12 is powered back on.

The wall mountable security case 12 may further include one or more tamper detectors or tamper detection units 66. The tamper detectors 66 may be configured to detect unauthorized tampering with the wall mountable security case 12. For example, the tamper detector(s) 66 may be configured to detect unauthorized removal of the tablet computing device 48, unauthorized removal of the wall mountable security case 12, unauthorized removal or damage to the front plate 42, etc. In some cases, the wall mountable security case 12 may include at least one tamper detector 66 positioned between the tablet computing device 48 and the wall (when the wall mountable security case 12 is secured to a wall) and/or between the wall mountable security case 12 and the wall when the wall mountable security case 12 is secured to a wall). For example, the tamper detector 66 may extend through at least one of the one or more apertures 56 in the back wall 40 of the housing from the tablet computing device 48 (or the back wall 40) and the wall on which the wall mountable security case 12 is mounted. This tamper detector 66 may be a push button switch and/or limit switch that is in a compressed configuration when the tablet computing device 48 is secured within the cavity 46 of the housing 38. If the tablet computing device 48 is removed from the cavity 46 and/or the wall mountable security case 12 is removed from the wall, the push button switch may release and trigger an alarm event. The alarm event may generate an audible noise (e.g., a horn), send notifications, and/or combinations thereof. An illustrative, but non-limiting limit switch for tamper detection may be a snap action switch such as the ZMA00A080L04PC available from C & K Components, Newton, Mass.

Additionally or alternatively, another tamper detector 66 may be positioned to detect the removal of the removable front plate 42. It is contemplated that this tamper detector may also include a push button switch and/or limit switch that is in a compressed configuration when the front plate 42 is in the correct or expected orientation and releases if the front plate 42 is removed. If the front plate 42 is removed from housing 38, the push button switch may release and trigger an alarm event. The alarm event may generate an audible noise (e.g., a horn), send notifications, and/or combinations thereof. Other tamper detectors may be used to detect unauthorized tampering (e.g., removal, damage, etc.) with the wall mountable security case 12, as desired. For example, other suitable tamper detectors may include, but are not limited to glass break detectors, an acoustic detector, and/or a shock detector. It is further contemplated that as the back of the housing 38 is formed from a material that is at least substantially transparent to RF energy, it is contemplated that the signals to and/or from the wall mountable security case 12 may not be blocked by placing metal over the front of the wall mountable security case 12 as the signals can pass through the back of the wall mountable security case 12.

It is contemplated that the tamper detectors 66 may be deactivated to allow for routine maintenance of the wall mountable security case 12 and/or the tablet computing device 48. For example, the tamper detectors 66 may be deactivated by entering a passcode into the tablet computing device 48 to allow for a battery 70 change.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A wall mountable security case for use with a security system of a building, the wall mountable security case mountable to a wall and comprising:
    a housing defining a cavity for receive a tablet computing device, wherein the cavity is defined by a back wall, a front wall and side walls extending between the back wall and the front wall;
    a communication unit housed by the housing, wherein the communication unit includes:
        a first transceiver for receiving messages from one or more remotely located security devices of the security system of the building; and
        a second transceiver for communicating with the tablet computing device when the tablet computing device is received by the cavity;
    a controller housed by the housing and operatively coupled to the communication unit for communicating with the one or more remotely located security devices of the security system via the first transceiver and the tablet computing device via the second transceiver;
    at least one tamper detector operatively coupled to the controller for detecting an unauthorized tampering with the wall mountable security case, wherein the at least one tamper detector includes a first sensor having a compressed configuration indicating no detected unauthorized tampering and an un-compressed configuration indicating a detected unauthorized tampering, the first sensor is maintained in the compressed configuration by both the tablet computing device and the wall when the tablet computing device is in the cavity of the housing and the wall mountable security case is mounted to the wall, and wherein the first sensor moves to the uncompressed configuration when either the wall mountable security case is removed from the wall or the tablet computing device is removed from the cavity of the housing;
    a power input for receiving primary power and for providing the primary power to the communication unit and the controller; and
    a back-up battery for providing back-up power to the communication unit and the controller when the primary power is unavailable.

2. The wall mountable security case of claim 1, wherein the controller is configured to receive messages from one or more remotely located security devices of the security system of the building via the first transceiver and transmit corresponding messages to the tablet computing device via the second transceiver.

3. The wall mountable security case of claim 1, wherein the first transceiver is a wireless transceiver.

4. The wall mountable security case of claim 2, wherein the second transceiver is a wireless transceiver.

5. The wall mountable security case of claim 4, wherein the first transceiver operates in a lower wireless frequency band than the second transceiver.

6. The wall mountable security case of claim 5, wherein the first transceiver is operates in a frequency band that is less than 1 GHz, and the second transceiver operates in a frequency band that is greater than 1 GHz.

7. The wall mountable security case of claim 6, wherein the second transceiver is a Bluetooth transceiver and/or a WiFi transceiver.

8. The wall mountable security case of claim 3, wherein the second transceiver is a wired transceiver.

9. The wall mountable security case of claim 1, wherein the first sensor comprises a push button switch and/or a limit switch that is compressed between the tablet computing device and the wall into the compressed configuration when the wall mountable security case is secured to the wall and the tablet computing device is installed in the cavity of housing.

10. The wall mountable security case of claim 1, wherein the front wall comprises a removable front plate that is removable to allow the tablet computing device to be installed in the cavity, and wherein the at least one tamper detector includes a second sensor that is positioned to detect removal of the removable front plate.

11. The wall mountable security case of claim 1, wherein the at least one tamper detector further includes one or more of a glass break detector, an acoustic detector and a shock detector.

12. The wall mountable security case of claim 1, wherein at least part of the front wall is transparent.

13. A wall mountable security system controller for controlling a security system a building, the wall mountable security system controller comprising:
  a tablet computing device, wherein the tablet computing device is loaded with an application program that is configured to provide a user interface for the security system of the building;
  a wall mountable security case including:
    a housing defining a cavity for removably receiving the tablet computing device, wherein the cavity is defined by a back wall, a front wall and side walls extending between the back wall and the front wall;
    a communication unit housed by the housing, wherein the communication unit includes:
      a first transceiver that is wireless and operates in a frequency band that is less than 1 GHz for receiving messages from one or more remotely located security devices of the security system of the building; and
      a second transceiver that operates in a frequency band that is greater than 1 GHz for communicating with the tablet computing device when the tablet computing device is received by the cavity;
    a controller housed by the housing and operatively coupled to the communication unit for communicating with the one or more remotely located security devices of the security system via the first transceiver and the tablet computing device via the second transceiver;
    the controller including security system logic that is configured to perform one or more security system functions, including identifying one or more security alarm events based at least in part on one or more of the messages received from the one or more remotely located security devices via the first transceiver, and in response to identifying a security alarm event, transmitting a one or more security system messages to a remote location via the communication unit;
    a power input for receiving primary power and for providing the primary power to the communication unit and the controller; and
    a back-up battery for providing back-up power to the communication unit and the controller when the primary power is unavailable.

14. The wall mountable security case of claim 13, wherein the second transceiver is wireless transceiver.

15. The wall mountable security case of claim 13, wherein the second transceiver is a wired transceiver.

16. The wall mountable security case of claim 13, further comprising at least one tamper detector coupled to the controller for detecting an unauthorized tampering of the wall mountable security case.

17. The wall mountable security case of claim 16, wherein the at least one tamper detector is configured to detect an unauthorized removal of the tablet computing device from the cavity and/or unauthorized removable of the wall mountable security case from a wall.

18. A wall mountable security case for use with a security system of a building, the wall mountable security case comprising:
  a housing defining a cavity for receive a tablet computing device, wherein the cavity is defined by a back wall, a front wall and side walls extending between the back wall and the front wall;
  a communication unit housed by the housing, wherein the communication unit includes:
    a wireless security transceiver that operates in a frequency band that is less than 1 GHz for receiving messages from one or more remotely located security devices of the security system of the building;
    a Bluetooth transceiver for communicating with the tablet computing device when the tablet computing device is received by the cavity; and
    a network transceiver for communicating over a network;
  a controller housed by the housing and operatively coupled to the communication unit for communicating with the one or more remotely located security devices of the security system via the wireless security transceiver and the tablet computing device via the Bluetooth transceiver;
  the controller including security system logic that is configured to perform one or more security system functions, including identifying one or more security alarm events based at least in part on one or more of the messages received from the one or more remotely located security devices via the first transceiver, and in response to identifying a security alarm event, transmitting a one or more security system messages to a remote location via the communication unit;
  a power input for receiving primary power and for providing the primary power to the communication unit and the controller; and
  a back-up battery for providing back-up power to the communication unit and the controller when the primary power is unavailable.

19. The wall mountable security case of claim 18, wherein the network transceiver comprises a WiFi transceiver.

20. The wall mountable security case of claim 18, wherein the network transceiver comprises a cellular transceiver.

* * * * *